United States Patent
Casaday et al.

[15] 3,667,011
[45] May 30, 1972

[54] BRUSHLESS DC TORQUE MOTOR INCLUDING COMMUTATOR BARS FED FROM A PHOTO-COMMUTATION CIRCUIT

[72] Inventors: William M. Casaday; Robert L. Fisher, both of Charlottesville, Va.

[73] Assignee: Sperry Rand Corporation
[22] Filed: July 15, 1970
[21] Appl. No.: 54,989

[52] U.S. Cl.............................318/138, 318/254, 318/439
[51] Int. Cl. .......................................................H02k 29/00
[58] Field of Search...................318/138, 254, 439, 696, 685

[56] References Cited
UNITED STATES PATENTS
3,185,910  5/1965  Knapp....................................318/138
3,412,303  11/1968  Rakes...............................318/254 X
3,140,434  7/1964  Hetzel...................................318/138

Primary Examiner—G. R. Simmons
Attorney—S. C. Yeaton

[57] ABSTRACT

The stator of a brushless DC motor is formed from a DC armature of the type used in conventional brush-type motors. A permanent magnet rotor is rotatable about the axis of the armature and carries an optical shutter that cooperates with a light source and a photosensor to provide switching signals. Commutating circuits, responsive to the switching signals, are permanently connected directly to commutator bars selected so that successive switching signals energize appropriate winding elements to maintain rotation of the rotor.

3 Claims, 4 Drawing Figures

Patented May 30, 1972

INVENTORS
WILLIAM M. CASADAY
ROBERT L. FISHER
BY
ATTORNEY

INVENTORS
WILLIAM M. CASADAY
ROBERT L. FISHER
BY
ATTORNEY

BRUSHLESS DC TORQUE MOTOR INCLUDING COMMUTATOR BARS FED FROM A PHOTO-COMMUTATION CIRCUIT

BACKGROUND OF THE INVENTION

1. Field of the Invention

The invention relates to electric motors and more specifically to brushless DC motors.

2. Description of the Prior Art

Brushless DC motors currently find wide use in a variety of applications. In many instances, it is desired to replace a conventional brush-type motor with a brushless-type motor. Ordinarily such a replacement requires an entirely new custom design. Motors constructed according to the principles of the present invention simplify such a substitution by providing a motor that uses the existing magnetic components of the original brush-type motor as a basis for constructing a motor of the brushless type.

SUMMARY OF THE INVENTION

A brushless DC motor having predetermined characteristics is constructed from a comparable brush-type motor by removing the brush ring assembly, attaching leads to selected commutator bars and providing suitable position sensing and switching circuits.

DESCRIPTION OF THE PREFERRED EMBODIMENT

Brushless DC motors (BDCM's) have come into prominence in recent years because of their reliability, simplicity and trouble-free performance. Their freedom from commutator-arcing makes them particularly desirable in situations where such arcing cannot be tolerated.

In many applications, it is desired to substitute a BDCM for an existing conventional brush-type motor. Such situations require that a BDCM be designed for the specific application. This necessitates a custom design of the magnetic circuit of the replacement motor and therefore involves costly and time-consuming effort.

The BDCM of the present invention utilizes the magnetic circuit of the original motor and therefore dispenses with the need of custom design.

Figure 1:
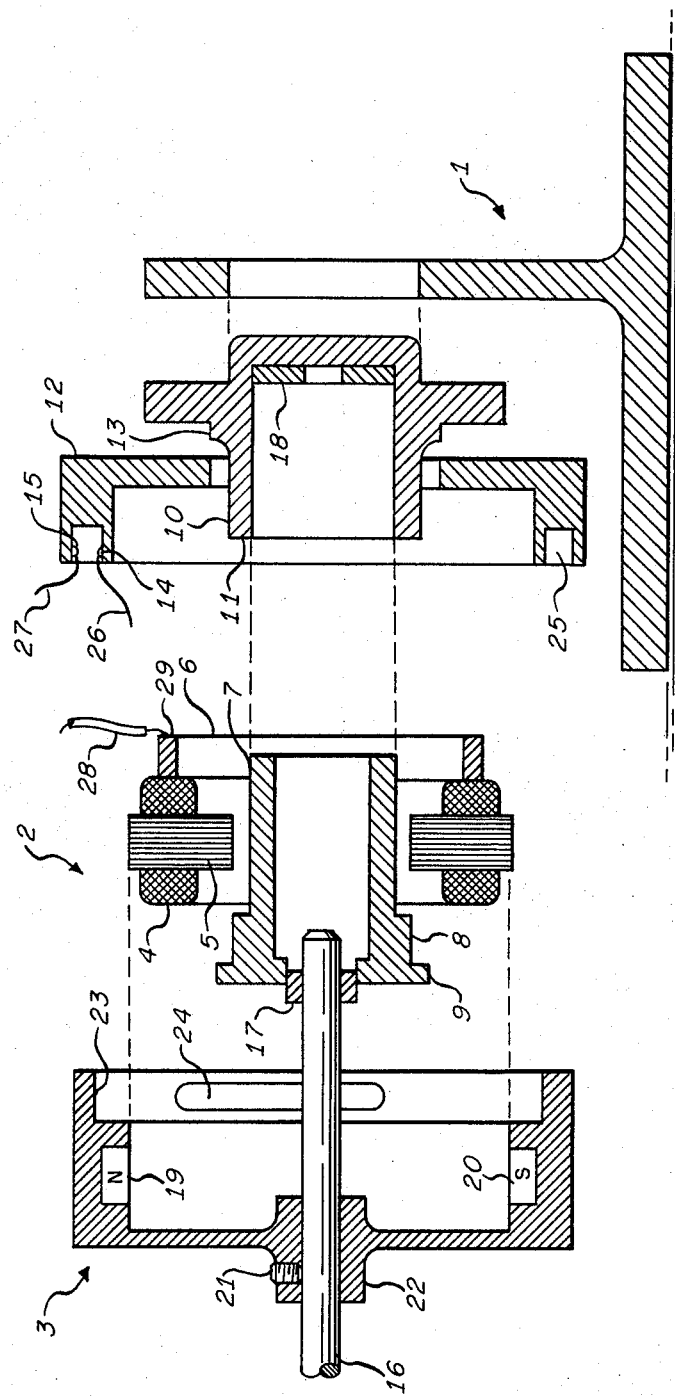
FIG. 1 is an exploded cross-sectional view illustrating the mechanical construction of a motor employing the principles of the invention.

A BDCM employing the principles of the present invention is illustrated functionally in FIG. 1.

The motor is mounted on a base 1 and includes an armature 2 and a rotor 3.

The armature contains a winding 4 mounted on a magnetic core 5 and includes a conventional commutator 6. The armature is mounted on an inner sleeve 7 which contains a raised shoulder 8 proportioned to mate with the inner surface of the armature core 5. The inner sleeve further includes a flange 9 which serves to abut the core 5 when the motor is assembled so as to secure the armature in a stationary position.

The inner sleeve 7 is proportioned to fit inside an outer sleeve 10. When the various components are mounted in place, the core 5 of the armature is clamped between the flange 9 and the face 11 of the outer sleeve. The outer sleeve 10 is securely mounted in a mounting hole formed in the base 1.

A sensor ring 12 fits over a shoulder 13 on the outer sleeve 10. Optical means such as the light source 14 and photosensor 15 are mounted in the sensor ring.

The motor shaft 16 is rotatably mounted in bearings 17 and 18. A given pair of magnetic poles includes a North pole 19 and a South pole 20. The faces of the magnetic poles 19 and 20 are positioned to rotate around the outer surface of the magnetic core 5 with a small air gap. The rotor is mounted on the shaft 16 with a set screw 21 through a collar 22. A light shield 23 consisting of a projecting cylindrical sleeve contains slots such as the slot 24 which permit light to pass from the light source to the photosensor in synchronism with rotor rotation.

The light shield 23 rotates in a recessed annular track 25.

A lead 26 connects the light source to an appropriate source of voltage and the lead 27 connects the photosensor to a switching circuit. A lead 28 is soldered to a commutator bar at a point 29 and serves to conduct stator coil energizing currents from the switching circuit to the armature winding 4.

In general, a slot such as the slot 24 is formed in the light shield 23 for each pair of magnetic poles in the motor. A lead such as the lead 28 is connected to a designated commutator bar for each tap to be formed on the stator winding.

The particular commutator bars to which the leads are connected may be selected by first calculating the number of commutator bars per pole pair. The number of commutation points is determined and the ratio of these two values is calculated. This ratio is then used to compute the number of commutator bars intervening between adjacent commutator bars to which connections are to be made.

Assume, for example, that a given DC armature contains 12 commutator bars per pair of magnetic poles and that a delta winding is desired. In this situation, three intervening commutator bars would be required so that leads would be connected to the first, fifth and ninth commutator bars. With the leads connected to these selected commutator bars, a delta winding will be formed having four winding elements per stator winding.

In general, if $m$ equals the number of commutator bars per pair of poles, and n equals the number of connections to be made to selected commutator bars, the number of commutator bars between adjacent bars to which connections are made will be given by the formula: $(m/n) - 1$.

Although the number of commutator bars per pole pair should be an exact multiple of the number of stator windings to provide a balanced motor, a slight unbalance may be tolerated without impairing operation of the motor to a serious degree.

In situations where the number of commutator bars per pole pair is not an exact multiple of the number of stator windings, the ratio $m$ is determined by neglecting fractional values. For example, if a DC armature contains 13 commutator bars per pole pair, the fractional value is neglected and the delta winding is formed by providing four coils on each of two windings and five coils on the third winding.

Figure 2:
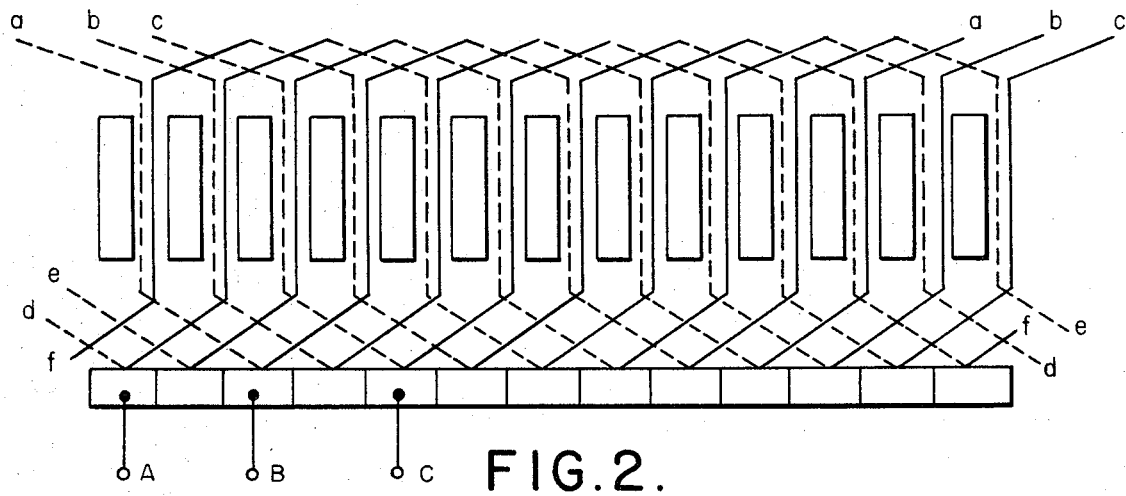
FIG. 2 is a developed diagram of an armature winding and commutator modified in accordance with the principles of the invention.

The manner in which connections are made to the commutator bars may be better understood by referring to FIG. 2 in which a conventional wave winding is shown in developed form. Assume that a motor using such a DC armature is to have two pairs of poles and that the armature contains 13 commutator bars. As is conventional in such armatures, the winding on the armature has regularly spaced connections from one side of the winding to individual commutator bars. A single winding element may be considered as that part of the winding having a beginning and an ending which are connected to commutator bars. Thus the winding connected to the first bar and the seventh bar constitutes a single winding element.

In the diagram, the loose ends having like identifying letters are connected together.

Applying the above-mentioned formula for determining the commutator bars to which connections are to be made, it may be noted that there are 13 commutator bars for two pole pairs; therefore, the value of $m$ will be 13/2 or 6.5. Disregarding the fractional value, the value of $m$ will be considered to be 6. Since a delta winding is desired, the value of $m/n$ will be 2 and the value of $(m/n) - 1$ will be 1. Thus one commutator bar will intervene between adjacent connection so that leads will be connected to the first, third and fifth commutator bars as indicated in FIG. 2. This spacing will provide the optimum balance for the desired motor design.

The operation of the completed motor is conventional and similar, for example, to that of the motor described in U.S. Pat. No. 3,444,406 issued to E. W. Aha on May 13, 1969, and assigned to the present assignee.

Figure 3A:
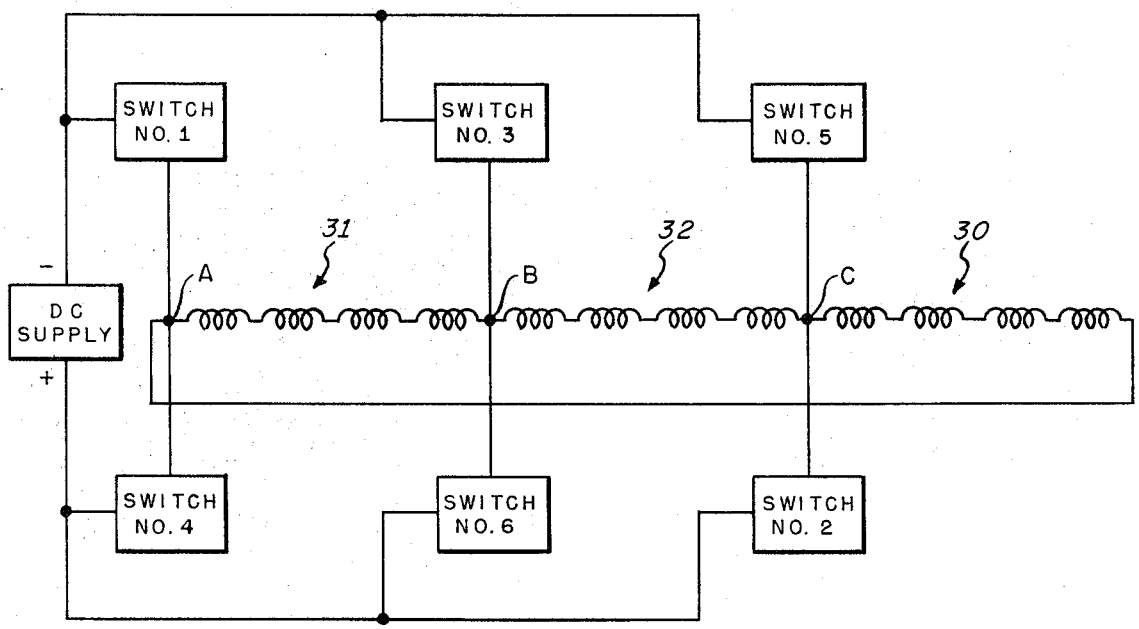
FIG. 3 is a block diagram illustrating a circuit suitable for use in a motor employing the principles of the invention.
Figure 3B:
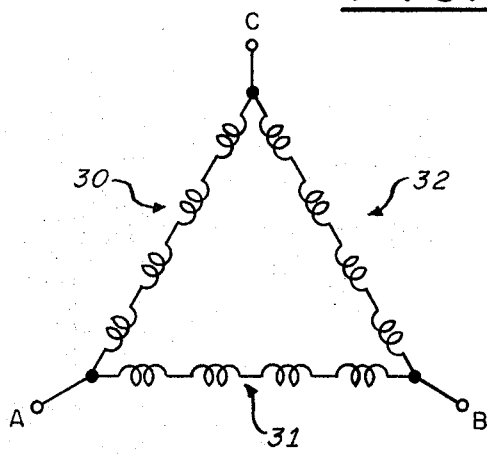

In accordance with that teaching, the operation of the motor may be understood by referring to the diagram of FIG. 3. The motor is energized from a DC supply through the switches SW1 through SW6. The delta winding as pictured in FIG. 3b contains three sections 30, 31 and 32 and is energized at junctions A, B and C as indicated. The switching elements SW1 through SW6 each include a photosensor, amplifying means, and switching means capable of carrying the stator winding currents as described in the aforementioned patent to Aha.

As the rotor rotates, pairs of photosensors in appropriate switches are illuminated so as to close the corresponding switches and permit current flow through the associated windings. The current flow through these windings produces a magnetic flux pattern which is slightly displaced from space-quadrature with the field of the magnetized rotor so that the rotor will seek magnetic alignment with the field of the armature winding in a predetermined direction of rotation.

Assume, for instance, that the slots in the light shield allow passage of light to the photosensors in switches SW1 and SW2. Junction A is now connected to the negative bus from the DC supply whereas junction C is connected to the positive bus from the DC supply. A current path now exists from switch SW2 to junction C, through the winding 30 to the junction A, and then through switch SW1 to the negative bus from the DC supply. A second parallel path also exists from the positive DC supply through the switch SW2, the winding 32, junction point B, the winding 31, and then through the switch SW1 to the negative bus. Under these conditions, the rotor will seek to align itself in the resultant magnetic field. As the rotor continues to rotate, photosensors in the switches SW2 and SW3 will eventually become simultaneously illuminated. When this occurs, junction C will be connected to the positive bus and junction B will be connected to the negative bus. Another set of parallel paths will be established through the stator windings which will effectively advance the magnetic field 30 degrees in the clockwise direction so as to maintain rotation of the rotor.

Thus the operation of the motor continues in conventional fashion.

Reversing means may be applied to the motor if desired by any one of a number of well known methods applied to prior art BDCM's.

Although the invention has been described with reference to a DC armature containing a wave winding, it will be appreciated that armatures containing lap windings may be used if desired. As will be evident to those skilled in the art, an armature for use in the invention may have any convenient number of slots and commutator bars and any convenient number of rotor poles may be employed.

Although delta windings have been specified, the principles of the invention may be applied to a ring winding having any suitable number of junction points.

The invention has found use primarily in low speed torque motors. However, the principles of the invention are not limited to such motors but may be applied to a wide variety of brush-type motors.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A brushless DC motor comprising a stationary DC armature having a longitudinal axis, a series of commutator bars arranged in an annular path around said longitudinal axis, a wave winding on said armature having regularly spaced connections from one side of said winding to individual commutator bars, a permanent magnet rotor arranged to rotate around said longitudinal axis in response to magnetic fields established by said armature, said rotor containing north and south magnetic poles disposed outside the periphery of said DC armature and arranged to produce a magnetic field along a diameter of the armature, optical sensing means for providing switching signals indicative of the rotational position of said rotor, said sensing means including a source of light, light responsive means and a shutter mounted on said rotor so as to modulate the light reaching said light responsive means, and switching means for providing energizing currents to selected ones of said commutator bars in response to said switching signals, said switching means being constructed to supply energizing current sequentially to individually selected commutator bars in response to successive signals to said light responsive means, said armature containing a series of 12 commutator bars per pole pair, said switching means being connected to three selected commutator bars so as to form three stator windings in said armature, said selected commutator bars being the first, fifth and ninth commutator bars in said series, respectively.

2. A brushless DC motor comprising a stationary DC armature having a longitudinal axis, a series of commutator bars arranged in an annular path around said longitudinal axis, a wave winding on said armature having regularly spaced connections from one side of said winding to individual commutator bars, a permanent magnet rotor arranged to rotate around said longitudinal axis in response to magnetic fields established by said armature, said rotor containing north and south magnetic poles disposed outside the periphery of said DC armature and arranged to produce a magnetic field along a diameter of the armature, optical sensing means for providing switching signals indicative of the rotational position of said rotor, said sensing means including a source of light, light responsive means and a shutter mounted on said rotor so as to modulate the light reaching said light responsive means, and switching means for providing energizing currents to selected ones of said commutator bars in response to said switching signals, said switching means being constructed to supply energizing current sequentially to individually selected commutator bars in response to successive signals to said light responsive means, said selected commutator bars being equal in number to the number of stator windings to be formed on said armature and separated by $(m/n) - 1$ intervening commutator bars where m equals the number of commutator bars per pair of magnetic poles and n equals the number of connections to the commutator bars, said shutter being constructed to provide one electrical switching cycle for each pole pair per rotor revolution.

3. The motor of claim 2 wherein said shutter is a cylindrical light shield mounted integrally on said rotor, said shield having a number of slots therein equal to the number of magnetic pole pairs, and wherein said light source and said light responsive means are mounted along a radius and on opposite sides of said cylindrical light shield so as to permit light from said light source to reach said light responsive means through said slots.

* * * * *